From United States Patent Office 3,441,626
Patented Apr. 29, 1969

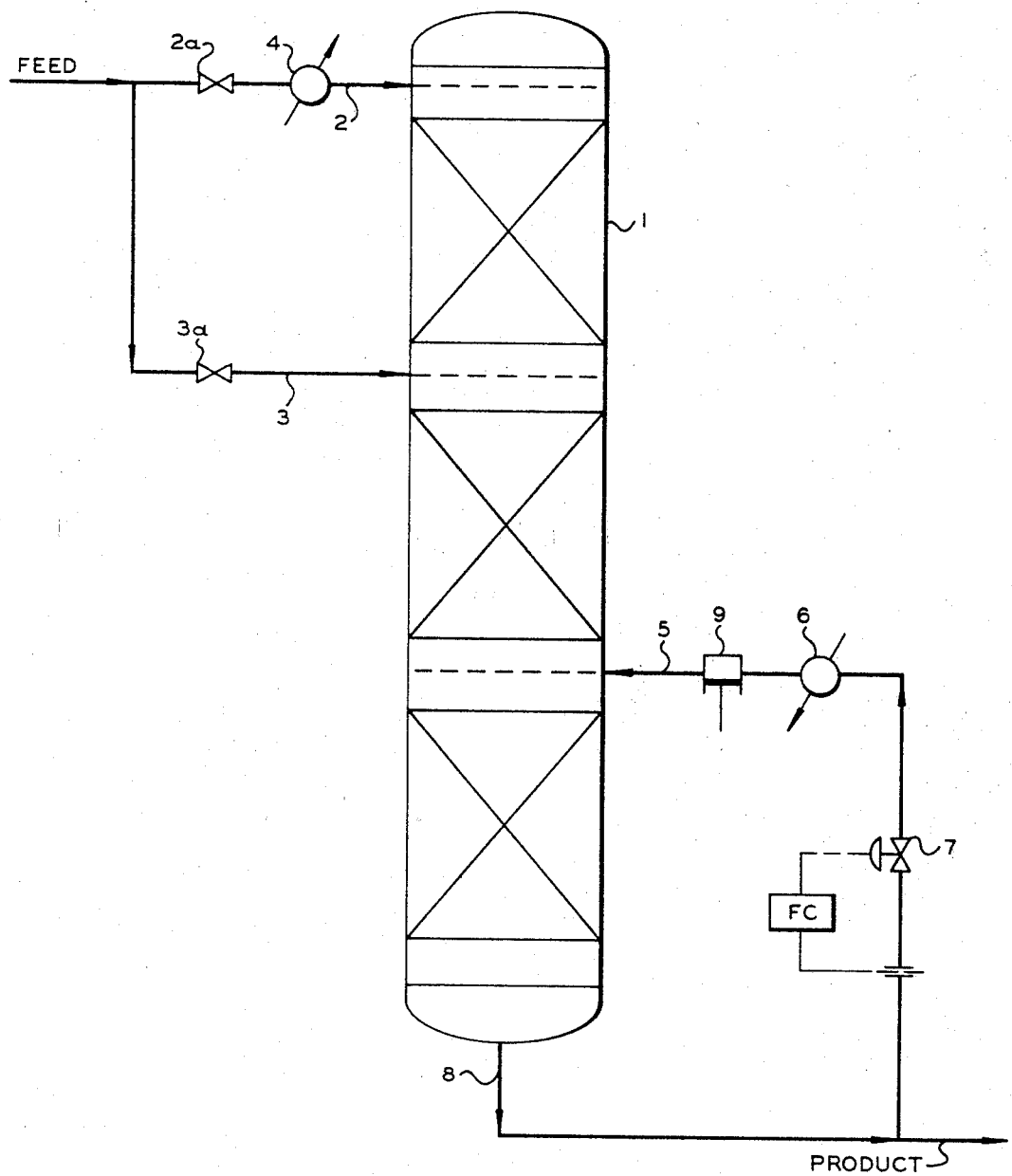

3,441,626
TEMPERATURE CONTROL OF EXOTHERMIC
REACTIONS
Carl S. Kelley, Bartlesville, Okla., assignor to Phillips
Petroleum Company, a corporation of Delaware
Filed Mar. 6, 1967, Ser. No. 620,979
Int. Cl. C07c 5/08, 11/24
U.S. Cl. 260—677                                    5 Claims

ABSTRACT OF THE DISCLOSURE

The desired reaction temperature or temperatures are maintained in an exothermic chemical reaction process by splitting the feed stream thereto into at least two portions, heating a first portion to a suitable reaction temperature and passing it to a reactor, and passing at least one (unheated) portion of the feedstream to the reactor downstream from the point of introduction of the first portion to serve as quench and yet also supply feed material. If several unheated portions are used, they are passed to the reactor progressively to provide a desired temperature profile.

---

This invention relates to temperature control of exothermic reactions. In another aspect, this invention relates to selective hydrogenation of unsaturated hydrocarbons in mixed hydrocarbon streams. In another aspect, this invention relates to selective hydrogenation of acetylenic compounds in olefin-rich hydrocarbon streams.

In many exothermic chemical reaction processes, it is necessary that the temperature of the reaction mixture be maintained within certain limits to prevent undesirable side reactions. This is particularly true for many hydrogenation and polymerization processes. Also, in many non-catalytic reactions such as, for example, the hydrodealkylation of toluene to benzene and methane, it is necessary to maintain the reaction temperature within certain limits to prevent unwanted benzene hydrogenation.

Close temperature control is of particular importance when selectively hydrogenating acetylenic compounds to olefin compounds and diolefin compounds to mono-olefin compounds in mixed hydrocarbon streams. For example, one of the usual methods of manufacturing olefins comprises passing a hydrocarbon material such as ethane, propane, butane, kerosene or other hydrocarbon-rich streams through a heating zone where such hydrocarbons are decomposed with the formation of hydrogen and one or more unsaturated compounds such as olefins or diolefins. The maximum yield of unsaturated compounds is usually obtained when the operation is performed at higher reaction temperatures; however, the use of high pyrolysis temperature also results in the formation of acetylenic compounds which contaminate the product stream. Although the acetylenic compounds are usually present in such hydrocarbon streams in a minor amount, often less than 1 mole percent, the acetylenic compounds are not readily removed without substantial loss of the more valuable olefin and diolefin constituents. For unlimited utilization of the olefin and diolefin-rich streams, it is necessary that the removal of the acetylenic hydrocarbons be substantially complete.

One method of removing the acetylenic hydrocarbon contaminants from the olefin and/or diolefin-rich stream involves contacting the contaminated mixture in the presence of hydrogen with a suitable catalyst at a proper temperature to selectively remove the acetylenic hydrocarbon contaminants without appreciable loss of the olefin and/or diolefin constituents. However, problems occur when using this catalytic process due to the exothermic nature of the hydrogenation reaction. This results in an increased reaction temperature along the length of the catalyst bed which substantially reduces the selectivity of the reaction. Thus, more and more of the olefinic material is converted by hydrogenation to paraffinic material. Also, as the reaction temperatures climb even higher, unwanted polymerization will occur which results in the formation of polymers which tend to poison the hydrogenation catalyst. On the other hand, if the reaction temperature is maintained very low, then commercially acceptable reaction rates for the selective hydrogenation process cannot be maintained. Thus, when the concentration of the acetylenic compounds becomes high, the temperature rise is so great that it was heretofore necessary to install heat exchangers within the catalyst beds to cool the hot gaseous reaction mixture and thus retain the catalyst selectivity. It is also known to recycle an acetylene-free stream to dilute the acetylenic constituents in an attempt to prevent the unwanted excessive heat rise, but this requires a rather high investment and operating cost per volume of acetylene or acetylenic compounds that are selectively hydrogenated.

Therefore, one object of this invention is to provide an improved method of controlling the reaction temperature of an exothermic chemical reaction process.

A further object of this invention is to provide an improved method of controlling the selective hydrogenation of saturated material within the mixed hydrocarbon streams.

According to this invention, the desired reaction temperature of an exothermic chemical reaction carried out in a suitable reaction zone is maintained within the desired range by initially passing to said reaction zone a primary feed stream heated to a desired reaction temperature. As the temperature of this primary stream rises to approach an undesirable level due to the exothermic nature of the chemical process, a cool or unheated secondary feed stream is introduced into said reaction zone to cool the hot primary stream to a proper temperature and furnish more unreacted material to the process. This invention can be applied to any catalytic or non-catalytic exothermic process such as, for example, hydrogenation, polymerization, and hydrodealkylation, etc.

According to a preferred embodiment of this invention, the desired temperature profile within a catalytic reaction zone is maintained in a selective hydrogenation process by heating a primary feed stream supplied thereto comprising mixed hydrocarbons containing unsaturated material to be hydrogenated such as acetylenes or diolefins, and hydrogen, said primary feed stream being heated to a desired selective hydrogenation temperature. As the temperature of the primary stream rises to approach an undesirable level due to the exothermic nature of the hydrogenation process, a cool or unheated secondary hydrocarbon feed stream containing said unsaturated material is introduced into, or between catalyst beds in said zone, to cool the hot primary stream, in which at least a portion of the acetylenic material is hydrogenated, to a proper selective hydrogenation temperature and to furnish more of said unsaturated feed material to the process. One or more of these secondary streams can be introduced to the catalyst bed, or between several catalyst beds, depending upon the length thereof or number of individual catalyst beds employed. Also, at least a portion of the hydrogenated product stream can be cooled, compressed, and recycled to the primary and secondary streams flowing through the bed to further maintain the proper temperature near the outlet of the reactor.

This invention can be more easily understood from a study of the drawing which is an illustration of the preferred embodiment thereof.

Now, referring to the drawing, a mixed hydrocarbon stream containing, in this example, the desired ethylene, the undesired acetylene, and the added hydrogen is introduced into reactor 1 via conduits 2 and 3, respectively. However, it must be understood that this invention can be utilized when carrying out other selective hydrogenation operations such as the conversion of diolefins to olefinic or more saturated compounds. Also, the hydrogen necessary for the process can also be supplied by a separate inlet conduit. Reactor 1 is filled with any conventional selective hydrogenation catalyst known in the art, such as noble metals and/or salts, for example, palladium supported on alumina such as disclosed in U.S. Patent 3,113,980, or alkalized iron oxide-chromium oxide, such as disclosed in U.S. Patent 2,814,653.

The mixed hydrocarbon stream flowing through conduits 2 and 3 contains from about 0.01 to about 2 weight percent acetylene, and, in this example, contains about 1 percent thereof. Ethylene is the olefin. As illustrated, a single mixed hydrocarbon stream initially flowing through conduit 2 is split so that portions of feed will flow into reactor 1 via conduits 2 and 3. The weight ratio of flow to conduit 2 and to conduit 3 is controlled by the positions of valves 2a and 3a respectively and will be about 10:1 to 5:1, depending upon initial temperatures, final temperatures, amounts of acetylene, etc. In this example, for each 100 pounds of feed, 85 pounds passes via conduit 2 and 15 pounds via conduit 3. The space velocity (volumes of gas per volume of catalyst per hour) is in the range of 100 to 12,000, usually about 2000 to 4000.

The feed stream entering reactor 1 via conduit 2 and entering heat exchanger 4 is maintained at a temperature from about 80 to about 110° F., and is usually, as in this example, at about 90° F. and at a pressure within the range of from 150 to 170 p.s.i.g. Heat exchanger 4 heats the hydrocarbon stream 2 flowing therethrough to a temperature in the range from about 160 to about 180° F., and preferably, as in this example, to about 170° F. Conduit 3 is positioned so that the cool or unheated secondary hydrocarbon stream will pass into the catalyst bed, or between beds, and admix with the hot primary stream, in which acetylene has, at least, been partially hydrogenated to ethylene, when the temperature of the primary stream has risen from an initial temperature of about 170° F. to a final temperature of about 175 to about 190° F., preferably about 185° F. (preferably about 15° F. temperature increase). This admixing will form a single hydrocarbon stream flowing through the catalyst bed and will be at a temperature of from about 160 to about 180° F., and preferably at about 170° F.

As the combined stream flows toward the outlet end of reactor 1, and as additional hydrogenation of acetylene occurs, a cooled recycle stream of substantially acetylene-free hydrocarbon material is passed into the catalyst bed. This recycle stream will be passed into the catalyst bed when the temperature of the hot gases flowing therethrough rises from about an initial temperature of about 170° to about 195° F., and preferably to about 190° F. The recycle stream passes into reactor 1 via conduit 5 and is cooled to a temperature in the range of from about 80 to about 110° F., usually about 90° F., by heat exchanger 6. The recycle stream is then compressed by compressor 9 to a pressure equal to or greater than the pressure of the hot gases in reactor 1 at the point where said recycle stream is introduced thereto. This compression is necessary because of the pressure drop of the hot gases passing through the catalyst bed. The quantity of this recycle gas is controlled by the position of valve 7 but it is normally within the range of from 10 to 20 pounds of recycle for each 100 pounds of feed flowing into reactor 1. In this example, 16 pounds of recycle per 100 pounds of feed is used. This cooled recycle stream will again cool the hot gases within reactor 1 to a temperature near the desired selective hydrogenation initial temperature maintained in stream 2 by heat exchanger 4.

The temperature at this locus is about 170 to 190° F., preferably about 175° F. The ethylene product, after hydrogenation of the acetylene, normally has less than 5 parts per million acetylene. The purified ethylene is removed from reactor 1 via conduit 8.

It is noted that the process as illustrated in the drawing utilizes only 1 cool or unheated secondary hydrocarbon feed stream; however, it is within the scope of this invention to utilize 2 or more of these cool or unheated secondary streams. Generally, as the relative amount of the unsaturated material to be hydrogenated increases in content in the feed stream, the more of these secondary streams will be preferred. Also, the secondary streams need not have the same source as the primary streams flowing through conduit 2, but can have different sources and different concentrations of the unsaturated material to be hydrogenated contained therein. As illustrated by the above discussion, this invention can be utilized to maintain a desired temperature profile within a selective hydrogenation catalytic reactor while at the same time providing for a maximum conversion or hydrogenation of the unsaturated material (acetylenes) within the feed stream, a minimum flow to the reactor of acetylene-free vaporous material, a minimum of polymer production, a minimum of hydrogenation of the olefin (ethylene) to paraffin, and a minimum heat exchange cost. Thus, as illustrated above, feed material flows through reactor 1 at a maximum of about 20° F. temperature rise, and only 85 percent of the feed material was initially heated from 90 to 170° F. The recycle cooling and compression cost is decreased in comparison to conventional methods, since the feed is split with only a portion thereof being preheated, the remainder being used as a cooling fluid and requiring no additional compression to pass it into the reaction zone. Also, the product stream is substantially acetylene free with a minimum amount of olefinic hydrogenation. When the hydrogenation temperature is allowed to rise to and remain above about 195° F., there is a considerable increase in the loss of olefin by its hydrogenation to the corresponding paraffin. Using the same conditions as the above-example, but operating at above 195° F., there is an undesired increase in the conversion of desired product ethylene into ethane. This is a loss of about 3 to 5 percent by weight of ethylene. It is noted that recycle conduit 5 can be eliminated especially if more than 1 unheated or cool secondary mixed hydrocarbon stream is supplied to reactor 1; however, this is not now preferred, since it is generally preferred not to introduce any unreacted unsaturated contaminant material into the lower portion of reactor 1.

While certain embodiments of this invention have been described for illustrative purposes, the invention is obviously not limited thereto. Various other modifications will be apparent to those skilled in the art in view of this disclosure. Such modifications are within the scope of this invention.

I claim:

1. In an exothermic chemical process for the selective hydrogenation of acetylenes in gases containing olefins in the presence of hydrogen with a suitable catalyst at temperatures below 195° F. with the same catalyst throughout the reaction zone wherein a primary feed stream containing said reactant materials and maintained at an initial reaction temperature below 195° F. is introduced into an inlet of a reaction zone, said reactant materials are reacted to hydrogenate the acetylenes only without hydrogenation of the olefins or hydrocracking in said reaction zone, and a product stream is withdrawn from an outlet of said reaction zone, the improvement comprising, passing at least one cool secondary feed stream having substantially the same composition as said feed stream into said reaction zone at a point of introduction between said inlet and outlet, the temperature of each secondary feed stream being maintained below that of the material within the reaction zone at each respective point of introduction to thereby supply reactant materials and cool the material within the reaction zone to a suitable reaction temperature below 195° F.

2. The process of claim 1 wherein only one of said secondary streams is passed to a region between said inlet and said outlet.

3. The process of claim 1 wherein said primary and secondary streams are passed to said reaction zone at rates in the range of from 100 to 12,000 volumes of gas feed per volume of catalyst per hour.

4. The process of claim 3 wherein said catalyst is selected from the group comprising: palladium on alumina and alkalized iron oxide and chromium oxide, said primary stream is heated to a temperature in the range of from 160 to 180° F., said secondary stream is at a temperature in the range of from 80 to 110° F., and is introduced into said reaction zone and combined with said primary stream when the temperature of said primary stream increases to a temperature within the range of from 175 to 190° F.

5. The process of claim 1 further comprising cooling from 10 to 20 weight percent of said hydrogenated stream to a temperature in the range of from 80 to 110° F., and passing it to said reaction zone adjacent said outlet to maintain the temperature of the stream flowing to said outlet at a temperature in the range of from 170 to 190° F.

References Cited

UNITED STATES PATENTS

| | | | |
|---|---|---|---|
| 2,971,901 | 2/1961 | Halik et al. | 208—143 |
| 2,993,855 | 7/1961 | Fear | 208—143 |
| 3,113,980 | 12/1963 | Robinson | 260—683 |
| 3,216,924 | 11/1965 | McKinney et al. | 208—143 |
| 3,248,316 | 4/1966 | Barger et al. | 208—143 |

HERBERT LEVINE, *Primary Examiner.*

U.S. Cl. X.R.

208—142, 143; 260—672

U.S. DEPARTMENT OF COMMERCE
PATENT OFFICE
Washington, D.C. 20231

UNITED STATES PATENT OFFICE
CERTIFICATE OF CORRECTION

Patent No. 3,441,626                 April 29, 1969

Carl S. Kelley

It is certified that error appears in the above identified patent and that said Letters Patent are hereby corrected as shown below:

In Claim 5, line 1 (column 6, line 1), delete "1" and substitute -- 4 --.

Signed and sealed this 21st day of October 1969.

(SEAL)
Attest:

Edward M. Fletcher, Jr.
Attesting Officer

WILLIAM E. SCHUYLER, JR.
Commissioner of Patents